(12) United States Patent
Bender et al.

(10) Patent No.: US 11,584,410 B2
(45) Date of Patent: *Feb. 21, 2023

(54) VEHICLE CONTROL SYSTEM

(71) Applicant: Westinghouse Air Brake Technologies Corporation, Wilmerding, PA (US)

(72) Inventors: Paul Gerard Bender, Clarksburg, MD (US); Charles L. Wolf, Olney, MD (US); Richard S. Klemanski, Walkersville, MD (US)

(73) Assignee: WESTINGHOUSE AIR BRAKE TECHNOLOGIES CORPORATION, Pittsburgh, PA (US)

( * ) Notice: Subject to any disclaimer, the term of this patent is extended or adjusted under 35 U.S.C. 154(b) by 700 days.

This patent is subject to a terminal disclaimer.

(21) Appl. No.: 16/603,469

(22) PCT Filed: Apr. 3, 2018

(86) PCT No.: PCT/US2018/025796
§ 371 (c)(1),
(2) Date: Oct. 7, 2019

(87) PCT Pub. No.: WO2018/187265
PCT Pub. Date: Oct. 11, 2018

(65) Prior Publication Data
US 2021/0269076 A1   Sep. 2, 2021

Related U.S. Application Data

(63) Continuation of application No. 15/481,817, filed on Apr. 7, 2017, now Pat. No. 10,479,382.

(51) Int. Cl.
*B61L 25/02* (2006.01)
*B61L 15/00* (2006.01)
(Continued)

(52) U.S. Cl.
CPC ......... *B61L 15/0027* (2013.01); *B61C 17/12* (2013.01); *B61L 15/0018* (2013.01);
(Continued)

(58) Field of Classification Search
CPC ............. B61L 15/0027; B61L 15/0018; B61L 15/0072; B61C 17/12
See application file for complete search history.

(56) References Cited

U.S. PATENT DOCUMENTS

| | | |
|---|---|---|
| 4,582,280 A | 4/1986 | Nichols et al. |
| 5,039,038 A | 8/1991 | Nichols et al. |

(Continued)

OTHER PUBLICATIONS

First Examination Report for corresponding AU Application No. 2018250112 dated Jun. 15, 2020.

(Continued)

*Primary Examiner* — Zachary L Kuhfuss
(74) *Attorney, Agent, or Firm* — The Small Patent Law Group LLC; Christopher R. Carroll

(57) ABSTRACT

Provided is a computer-implemented method for determining a communication status in a train consist operating in a distributed power system, the train consist including a lead locomotive and a plurality of remote locomotives. The method includes, for each remote locomotive of the plurality of remote locomotives that receives the command message directly from the lead locomotive, setting the message source indicator of the remote locomotive to a first state representative of a direct receipt of the command message, incrementing the message source counter for each response message received by the remote locomotive from other remote locomotives in which the respective message source indicator is set to the first state, generating a response message including a value of the message source indicator and a value of the message source counter, and transmitting (Continued)

the response message. A system and computer program product are also disclosed.

21 Claims, 6 Drawing Sheets

(51) Int. Cl.
    *B61C 17/12*     (2006.01)
    *B61L 25/00*     (2006.01)
    *B61L 25/04*     (2006.01)

(52) U.S. Cl.
    CPC ....... *B61L 15/0072* (2013.01); *B61L 15/0081* (2013.01); *B61L 25/02* (2013.01); *B61L 25/028* (2013.01); *B60L 2200/26* (2013.01); *B61L 25/00* (2013.01); *B61L 25/025* (2013.01); *B61L 25/026* (2013.01); *B61L 25/04* (2013.01); *B61L 2205/00* (2013.01)

(56) References Cited

U.S. PATENT DOCUMENTS

| | | | |
|---|---|---|---|
| 5,681,015 | A | 10/1997 | Kull |
| 5,720,455 | A | 2/1998 | Kull et al. |
| 6,400,281 | B1 | 6/2002 | Darby, Jr. et al. |
| 6,401,015 | B1 | 6/2002 | Stewart et al. |
| 6,443,538 | B1 | 9/2002 | Smith, Jr. et al. |
| 6,691,957 | B2 | 2/2004 | Hess, Jr. et al. |
| 6,759,951 | B2 | 7/2004 | Kellner et al. |
| 6,867,708 | B2 | 3/2005 | Darby, Jr. et al. |
| 6,922,619 | B2 | 7/2005 | Baig et al. |
| 7,038,597 | B2 | 5/2006 | Smith |
| 7,263,647 | B2 | 8/2007 | Bryant et al. |
| 7,346,699 | B1 | 3/2008 | Krause et al. |
| 7,762,631 | B2 | 7/2010 | Smith |
| 7,873,450 | B2 | 1/2011 | Lawry et al. |
| 8,073,582 | B2 | 12/2011 | Kellner et al. |
| 8,112,191 | B2 | 2/2012 | Kumar et al. |
| 8,190,311 | B2 | 5/2012 | Smith |
| 8,190,315 | B2 | 5/2012 | Kraeling et al. |
| 8,224,237 | B2 | 7/2012 | Smith, Jr. et al. |
| 8,280,566 | B2 | 10/2012 | Foy, III et al. |
| 8,295,998 | B2 | 10/2012 | Goodermuth et al. |
| 8,328,144 | B2 | 12/2012 | Smith |
| 8,328,145 | B2 | 12/2012 | Smith |
| 8,380,413 | B2 | 2/2013 | Smith et al. |
| 8,406,941 | B2 | 3/2013 | Smith |
| 8,428,798 | B2 | 4/2013 | Kull |
| 8,510,026 | B2 | 8/2013 | DeSanzo et al. |
| 8,589,003 | B2 | 11/2013 | Brand et al. |
| 8,620,552 | B2 | 12/2013 | DeSanzo et al. |
| 9,025,038 | B2 | 5/2015 | Mason et al. |
| 9,114,817 | B2 | 8/2015 | Kraeling et al. |
| 2003/0094545 | A1 | 5/2003 | Smith |
| 2003/0125852 | A1 | 7/2003 | Schade et al. |
| 2006/0085103 | A1 | 4/2006 | Smith, Jr. et al. |
| 2007/0233335 | A1 | 10/2007 | Kumar et al. |
| 2007/0236079 | A1 | 10/2007 | Kull |
| 2008/0269957 | A1* | 10/2008 | Rooney ................ B61L 25/028 701/1 |
| 2010/0118988 | A1 | 5/2010 | Smith et al. |
| 2010/0235017 | A1 | 9/2010 | Peltonen et al. |
| 2012/0290156 | A1 | 11/2012 | Woo et al. |
| 2014/0005915 | A1 | 1/2014 | Smith et al. |
| 2014/0078926 | A1 | 3/2014 | Nishioka et al. |
| 2015/0198712 | A1 | 7/2015 | Soderi et al. |
| 2015/0210168 | A1 | 7/2015 | Pykkonen et al. |
| 2015/0321683 | A1 | 11/2015 | Kraeling et al. |
| 2015/0360700 | A1 | 12/2015 | Cooper et al. |
| 2016/0075355 | A1 | 3/2016 | Kellner et al. |
| 2016/0107661 | A1 | 4/2016 | Cooper et al. |
| 2016/0119799 | A1 | 4/2016 | Hutchins et al. |
| 2016/0134994 | A1 | 5/2016 | Kellner et al. |
| 2016/0135154 | A1 | 5/2016 | Klemanski et al. |
| 2016/0339929 | A1 | 11/2016 | Schoenly et al. |

OTHER PUBLICATIONS

International Search Report dated Jul. 20, 2018 for International Application No. PCT/US2018/025796.

* cited by examiner

VEHICLE CONTROL SYSTEM

CROSS REFERENCE TO RELATED APPLICATION

This invention claims priority to International Application No. PCT/US2018/025796 filed Apr. 3, 2018, which claims priority to U.S. Utility application Ser. No. 15/481,817 filed Apr. 7, 2017, the disclosures of which are incorporated by reference in their entirety.

BACKGROUND OF THE INVENTION

Field of the Invention

This invention relates generally to distributed power systems for railroads and, in one particular embodiment, to a system, method, and apparatus for determining a communication status of locomotives in a distributed power system.

Technical Considerations

Trains often include multiple locomotives in a consist. In such arrangements, a distributed power system is used to provide a lead locomotive with control over one or more other locomotives (e.g., remote locomotives), thereby coordinating the on-board control systems of each locomotive operating in a given train. Within such a distributed power system, the locomotives communicate via Radio Distributed Power (RDP). However, such radio communication can be volatile while the train is traveling and/or is in operation. Several factors, such as train length, environmental conditions, unpredictable physical obstructions, and continually changing terrain, may affect radio communication among the locomotives and therefore affect the control a lead locomotive has over the remote locomotives in the consist.

Optimal RDP operation of a train requires clear radio communications bi-directionally, from the lead locomotive to each remote locomotive and from each remote locomotive to the lead locomotive. If a communication response from a remote locomotive fails to occur in such an arrangement, an operator of the train is informed that there is a communications loss and instructed to take a response action (e.g., slow down the train). In some cases, this response action may be an overreaction that was not necessary. Moreover, there is currently no way for a train operator to determine the overall quality of radio communications among locomotives in a consist.

SUMMARY OF THE INVENTION

Accordingly, it is an object of the present invention to provide a system and method for determining a communication status of locomotives in a distributed power system that overcomes some or all of the deficiencies of the prior art.

According to a preferred and non-limiting embodiment, provided is a computer-implemented method for determining a communication status in a train consist operating in a distributed power system, the train consist comprising a lead locomotive and a plurality of remote locomotives, the method comprising: (a) transmitting a command message from a lead locomotive to the plurality of remote locomotives, wherein each remote locomotive of the plurality of remote locomotives comprises a message source indicator and a message source counter; (b) for each remote locomotive of the plurality of remote locomotives that receives the command message directly from the lead locomotive: (i) setting the message source indicator of the remote locomotive to a first state representative of a direct receipt of the command message; (ii) incrementing the message source counter for each response message received by the remote locomotive from other remote locomotives in which the respective message source indicator is set to the first state; (iii) generating a response message comprising a value of the message source indicator and a value of the message source counter; and (iv) transmitting the response message; (c) for each remote locomotive of the plurality of remote locomotives that receives the command message from at least one other remote locomotive but does not receive the command message directly from the lead locomotive: (i) setting the message source indicator of the remote locomotive to a second state representative of an indirect receipt of the command message; (ii) incrementing the message source counter for each response message received by the remote locomotive from other remote locomotives in which the respective message source indicator is set to the first state; (iii) generating a response message comprising a value of the message source indicator and a value of the message source counter; and (iii) transmitting the response message; and (d) determining, on the lead locomotive, a train-wide communication status based at least partially on each response message received by the lead locomotive.

In non-limiting embodiments, for each remote locomotive of the plurality of remote locomotives that receives the command message directly from the lead locomotive, the method may further include: resetting the message source counter after receiving a new command message that was not previously received. Moreover, each remote locomotive may transmit at least one response message via radio frequency such that the response messages are receivable by the lead locomotive and/or remote locomotives that are within range. The message source indicator may comprise a semaphore. The response message generated by each remote locomotive may include the command message. Each remote locomotive of the plurality of remote locomotives may transmit response messages at staggered predetermined time intervals.

In non-limiting examples, determining the communication status for each of the remote locomotives based at least partially on the response messages may comprise: monitoring, at the lead locomotive, the message source counter of each response message received from the plurality of remote locomotives; and determining a number of remote locomotives that received the command message directly from the lead locomotive based on the message source counter of each response message received from the plurality of remote locomotives. Further, non-limiting embodiments of the method may further comprise generating a train-wide quality of service of transmission indication based on the number of remote locomotives that received the command message directly from the lead locomotive, wherein the quality of service indication is 100% if every remote locomotive of the plurality of remote locomotives directly received the command message from the lead locomotive, and wherein the quality of service indication is less than 100% if fewer than every remote locomotive of the plurality of remote locomotives directly received the command message from the lead locomotive.

In non-limiting examples, each remote locomotive of the plurality of remote locomotives may comprise a remote acknowledgement counter, and the method may further comprise: for each remote locomotive, incrementing the remote acknowledgement counter each time a response message is received from another remote locomotive. In some non-limiting embodiments, the method may further comprise generating a train-wide quality of service of receipt indication based at least partially on a value of the remote acknowledgement counter for each remote locomotive of the plurality of remote locomotives.

Non-limiting embodiments of the method may also include generating a train-wide quality of service indication based on the communication status for each of the remote locomotives, the train-wide quality of service indication comprising at least one of the following: a signal-strength bar chart, a numerical representation, an image, an icon, a color-coded visual representation, or any combination thereof. The method may also include storing the communication status for each of the remote locomotives and/or a train-wide quality of service indication generated from the communication status for each of the remote locomotives in at least one of an event log and an event recorder. The method may further include determining an arrangement of radio-frequency repeaters based at least partially on the communication status for each of the remote locomotives and/or a train-wide quality of service indication generated from the communication status for each of the remote locomotives.

According to another preferred and non-limiting embodiment, provided is a system for determining a communication status in a train consist in a distributed power system, the train consist comprising a lead locomotive and a plurality of remote locomotives, the system comprising: a first on-board control system arranged in the lead locomotive, the first on-board control system programmed or configured to transmit a command message to the plurality of remote locomotives; a plurality of remote on-board control systems arranged in the plurality of remote locomotives, each remote locomotive comprising a remote on-board control system including a message source indicator and a message source counter, wherein each remote on-board control system is programmed or configured to: (a) for each remote locomotive of the plurality of remote locomotives that receives the command message directly from the lead locomotive: (i) set the message source indicator of the remote locomotive to a first state representative of a direct receipt of the command message; (ii) increment the message source counter for each response message received by the remote locomotive from other remote locomotives in which the respective message source indicator is set to the first state; (iii) generate a response message comprising a value of the message source indicator and a value of the message source counter; and (iv) transmit the response message; and (b) for each remote locomotive of the plurality of remote locomotives that receives the command message from at least one other remote locomotive but does not receive the command message directly from the lead locomotive: (i) set the message source indicator of the remote locomotive to a second state representative of an indirect receipt of the command message; (ii) generate a response message comprising a value of the message source indicator; and (iii) transmit the response message from the remote locomotive to the at least one other remote locomotive, wherein the first on-board control system is programmed or configured to determine a communication status for each of the remote locomotives based at least partially on the response messages.

In non-limiting embodiments, the on-board control system of each remote locomotive may be further programmed or configured to reset the message source counter after receiving a new command message that was not previously received. Moreover, each remote locomotive may transmit at least one response message via radio frequency such that the response messages are receivable by the lead locomotive and/or remote locomotives that are within range. The message source indicator comprises a semaphore. The response message generated by each remote locomotive may include the command message. Each remote locomotive of the plurality of remote locomotives may transmit response messages at staggered predetermined time intervals.

In non-limiting embodiments, the first on-board control system is further programmed or configured to: monitor the message source counter of each response message received from the plurality of remote locomotives; and determine a number of remote locomotives that received the command message directly from the lead locomotive based on the message source counter of each response message received from the plurality of remote locomotives, wherein the communication status is determined based on the number of remote locomotives that received the command message directly from the lead locomotive. Moreover, the first on-board control system may be further programmed or configured to generate a train-wide quality of service of transmission indication based on the number of remote locomotives that received the command message directly from the lead locomotive, wherein the quality of service indication is 100% if every remote locomotive of the plurality of remote locomotives directly received the command message from the lead locomotive, and wherein the quality of service indication is less than 100% if fewer than every remote locomotive of the plurality of remote locomotives directly received the command message from the lead locomotive.

In non-limiting embodiments, each remote locomotive of the plurality of remote locomotives may further comprise a remote acknowledgement counter, and the on-board control system of each remote locomotive may be further programmed or configured to increment the remote acknowledgement counter for a respective remote locomotive each time a response message is received from another remote locomotive. The first on-board control system may be further programmed or configured to generate a train-wide quality of service of receipt indication based at least partially on a value of the remote acknowledgement counter for each remote locomotive of the plurality of remote locomotives.

In further non-limiting embodiments, the first on-board control system is further programmed or configured to generate a train-wide quality of service indication based on the communication status for each of the remote locomotives, the train-wide quality of service indication comprising at least one of the following: a signal-strength bar chart, a numerical representation, an image, an icon, a color-coded visual representation, or any combination thereof. Further, the first on-board control system may be further programmed or configured to store the communication status for each of the remote locomotives and/or a train-wide quality of service indication generated from the communication status for each of the remote locomotives in at least one of an event log and an event recorder. In some examples, the first on-board control system may be further programmed or configured to determine an arrangement of radio-frequency repeaters based at least partially on the communication status for each of the remote locomotives and/or a train-wide quality of service indication generated from the communication status for each of the remote locomotives.

According to a further preferred and non-limiting embodiment, provided is a computer program product for determining a communication status in a train consist operating in a distributed power system, the train consist comprising a lead locomotive and a plurality of remote locomotives, the computer program product comprising at least one non-transitory computer-readable medium including program instructions that, when executed by an on-board control system of the lead locomotive, causes the on-board control system to: transmit a command message to the plurality of remote locomotives, wherein each remote locomotive of the plurality of remote locomotives comprises a message source indicator and a message source counter; receive a plurality of response messages from at least a portion of the plurality of remote locomotives; and determine a train-wide communication status based at least partially on each of the plurality of response messages received by the lead locomotive.

A summary of the present invention is provided in the following numbered clauses:

Clause 1: A computer-implemented method for determining a communication status in a train consist operating in a distributed power system, the train consist comprising a lead locomotive and a plurality of remote locomotives, the method comprising: (a) transmitting a command message from a lead locomotive to the plurality of remote locomotives, wherein each remote locomotive of the plurality of remote locomotives comprises a message source indicator and a message source counter; (b) for each remote locomotive of the plurality of remote locomotives that receives the command message directly from the lead locomotive: (i) setting the message source indicator of the remote locomotive to a first state representative of a direct receipt of the command message; (ii) incrementing the message source counter for each response message received by the remote locomotive from other remote locomotives in which the respective message source indicator is set to the first state; (iii) generating a response message comprising a value of the message source indicator and a value of the message source counter; and (iv) transmitting the response message; (c) for each remote locomotive of the plurality of remote locomotives that receives the command message from at least one other remote locomotive but does not receive the command message directly from the lead locomotive: (i) setting the message source indicator of the remote locomotive to a second state representative of an indirect receipt of the command message; (ii) incrementing the message source counter for each response message received by the remote locomotive from other remote locomotives in which the respective message source indicator is set to the first state; (iii) generating a response message comprising a value of the message source indicator and a value of the message source counter; and (iii) transmitting the response message; and (d) determining, on the lead locomotive, a train-wide communication status based at least partially on each response message received by the lead locomotive.

Clause 2: The computer-implemented method of clause 1, wherein for each remote locomotive of the plurality of remote locomotives that receives the command message directly from the lead locomotive, the method further comprises: resetting the message source counter after receiving a new command message that was not previously received.

Clause 3: The computer-implemented method of clauses 1 or 2, wherein each remote locomotive transmits at least one response message via radio frequency such that the response messages are receivable by the lead locomotive and/or remote locomotives that are within range.

Clause 4: The computer-implemented method of any of clauses 1-3, wherein the message source indicator comprises a semaphore.

Clause 5: The computer-implemented method of any of clauses 1-4, wherein the response message generated by each remote locomotive further comprises the command message.

Clause 6: The computer-implemented method of any of clauses 1-5, wherein each remote locomotive of the plurality of remote locomotives transmits response messages at staggered predetermined time intervals.

Clause 7: The computer-implemented method of any of clauses 1-6, wherein determining the communication status for each of the remote locomotives based at least partially on the response messages comprises: monitoring, at the lead locomotive, the message source counter of each response message received from the plurality of remote locomotives; and determining a number of remote locomotives that received the command message directly from the lead locomotive based on the message source counter of each response message received from the plurality of remote locomotives.

Clause 8: The computer-implemented method of any of clauses 1-7, further comprising generating a train-wide quality of service of transmission indication based on the number of remote locomotives that received the command message directly from the lead locomotive, wherein the quality of service indication is 100% if every remote locomotive of the plurality of remote locomotives directly received the command message from the lead locomotive, and wherein the quality of service indication is less than 100% if fewer than every remote locomotive of the plurality of remote locomotives directly received the command message from the lead locomotive.

Clause 9: The computer-implemented method of any of clauses 1-8, wherein each remote locomotive of the plurality of remote locomotives further comprises a remote acknowledgement counter, the method further comprising: for each remote locomotive, incrementing the remote acknowledgement counter each time a response message is received from another remote locomotive.

Clause 10: The computer-implemented method of clause 9, further comprising generating a train-wide quality of service of receipt indication based at least partially on a value of the remote acknowledgement counter for each remote locomotive of the plurality of remote locomotives.

Clause 11: The computer-implemented method of any of clauses 1-10, further comprising generating a train-wide quality of service indication based on the communication status for each of the remote locomotives, the train-wide quality of service indication comprising at least one of the following: a signal-strength bar chart, a numerical representation, an image, an icon, a color-coded visual representation, or any combination thereof.

Clause 12: The computer-implemented method of any of clauses 1-11, further comprising storing the communication status for each of the remote locomotives and/or a train-wide quality of service indication generated from the communication status for each of the remote locomotives in at least one of an event log and an event recorder.

Clause 13: The computer-implemented method of any of clauses 1-12, further comprising determining an arrangement of radio-frequency repeaters based at least partially on the communication status for each of the remote locomotives and/or a train-wide quality of service indication generated from the communication status for each of the remote locomotives.

Clause 14: A system for determining a communication status in a train consist in a distributed power system, the train consist comprising a lead locomotive and a plurality of remote locomotives, the system comprising: a first on-board control system arranged in the lead locomotive, the first on-board control system programmed or configured to transmit a command message to the plurality of remote locomotives; a plurality of remote on-board control systems arranged in the plurality of remote locomotives, each remote locomotive comprising a remote on-board control system including a message source indicator and a message source counter, wherein each remote on-board control system is programmed or configured to: (a) for each remote locomotive of the plurality of remote locomotives that receives the command message directly from the lead locomotive: (i) set the message source indicator of the remote locomotive to a first state representative of a direct receipt of the command message; (ii) increment the message source counter for each response message received by the remote locomotive from other remote locomotives in which the respective message source indicator is set to the first state; (iii) generate a response message comprising a value of the message source indicator and a value of the message source counter; and (iv) transmit the response message; and (b) for each remote locomotive of the plurality of remote locomotives that receives the command message from at least one other remote locomotive but does not receive the command message directly from the lead locomotive: (i) set the message source indicator of the remote locomotive to a second state representative of an indirect receipt of the command message; (ii) generate a response message comprising a value of the message source indicator; and (iii) transmit the response message from the remote locomotive to the at least one other remote locomotive, wherein the first on-board control system is programmed or configured to determine a communication status for each of the remote locomotives based at least partially on the response messages.

Clause 15: The system of clause 14, wherein the on-board control system of each remote locomotive is further programmed or configured to reset the message source counter after receiving a new command message that was not previously received.

Clause 16: The system of clauses 14 or 15, wherein each remote locomotive transmits at least one response message via radio frequency such that the response messages are receivable by the lead locomotive and/or remote locomotives that are within range.

Clause 17: The system of any of clauses 14-16, wherein the message source indicator comprises a semaphore.

Clause 18: The system of any of clauses 14-17, wherein the response message generated by each remote locomotive further comprises the command message.

Clause 19: The system of any of clauses 14-18, wherein each remote locomotive of the plurality of remote locomotives transmits response messages at staggered predetermined time intervals.

Clause 20: The system of any of clauses 14-19, wherein the first on-board control system is programmed or configured to: monitor the message source counter of each response message received from the plurality of remote locomotives; and determine a number of remote locomotives that received the command message directly from the lead locomotive based on the message source counter of each response message received from the plurality of remote locomotives, wherein the communication status is determined based on the number of remote locomotives that received the command message directly from the lead locomotive.

Clause 21: The system of any of clauses 14-20, wherein the first on-board control system is further programmed or configured to generate a train-wide quality of service of transmission indication based on the number of remote locomotives that received the command message directly from the lead locomotive, wherein the quality of service indication is 100% if every remote locomotive of the plurality of remote locomotives directly received the command message from the lead locomotive, and wherein the quality of service indication is less than 100% if fewer than every remote locomotive of the plurality of remote locomotives directly received the command message from the lead locomotive.

Clause 22: The system of any of clauses 14-21, wherein each remote locomotive of the plurality of remote locomotives further comprises a remote acknowledgement counter, and wherein the on-board control system of each remote locomotive is further programmed or configured to increment the remote acknowledgement counter for a respective remote locomotive each time a response message is received from another remote locomotive.

Clause 23: The system of any of clauses 14-22, wherein the first on-board control system is further programmed or configured to generate a train-wide quality of service of receipt indication based at least partially on a value of the remote acknowledgement counter for each remote locomotive of the plurality of remote locomotives.

Clause 24: The system of any of clauses 14-23, wherein the first on-board control system is further programmed or configured to generate a train-wide quality of service indication based on the communication status for each of the remote locomotives, the train-wide quality of service indication comprising at least one of the following: a signal-strength bar chart, a numerical representation, an image, an icon, a color-coded visual representation, or any combination thereof.

Clause 25: The system of any of clauses 14-24, wherein the first on-board control system is further programmed or configured to store the communication status for each of the remote locomotives and/or a train-wide quality of service indication generated from the communication status for each of the remote locomotives in at least one of an event log and an event recorder.

Clause 26: The system of any of clauses 14-25, wherein the first on-board control system is further programmed or configured to determine an arrangement of radio-frequency repeaters based at least partially on the communication status for each of the remote locomotives and/or a train-wide quality of service indication generated from the communication status for each of the remote locomotives.

Clause 27: A computer program product for determining a communication status in a train consist operating in a distributed power system, the train consist comprising a lead locomotive and a plurality of remote locomotives, the computer program product comprising at least one non-transitory computer-readable medium including program instructions that, when executed by an on-board control system of the lead locomotive, causes the on-board control system to: transmit a command message to the plurality of remote locomotives, wherein each remote locomotive of the plurality of remote locomotives comprises a message source indicator and a message source counter; receive a plurality of response messages from at least a portion of the plurality of remote locomotives; determine a train-wide communication status based at least partially on each of the plurality of response messages received by the lead locomotive.

These and other features and characteristics of the present invention, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and the claims, the singular form of "a," "an," and "the" include plural referents unless the context clearly dictates otherwise.

BRIEF DESCRIPTION OF THE DRAWINGS

Additional advantages and details of the invention are explained in greater detail below with reference to the exemplary embodiments that are illustrated in the accompanying schematic figures, in which.

DESCRIPTION OF THE PREFERRED EMBODIMENTS

Figure 1:
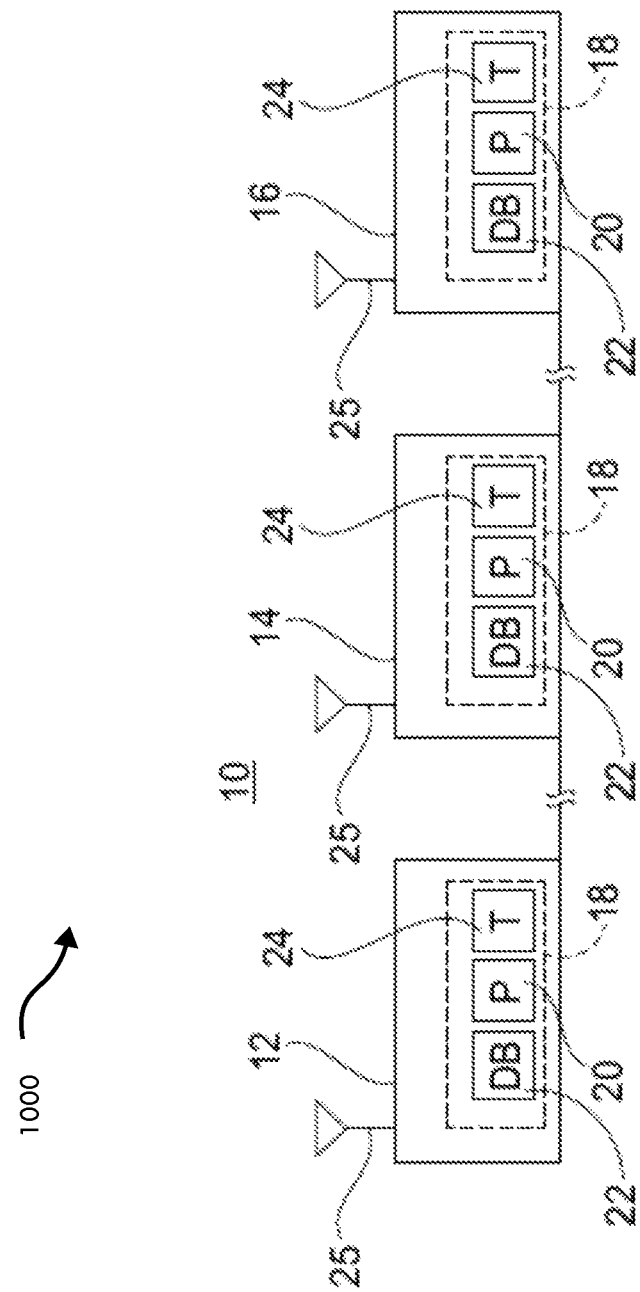
FIG. 1 is a schematic diagram for a system for determining a communication status of locomotives in a distributed power system according to the principles of the present invention.

For purposes of the description hereinafter, the terms "end," "upper," "lower," "right," "left," "vertical," "horizontal," "top," "bottom," "lateral," "longitudinal," and derivatives thereof shall relate to the invention as it is oriented in the drawing figures. However, it is to be understood that the invention may assume various alternative variations and step sequences, except where expressly specified to the contrary. It is also to be understood that the specific devices and processes illustrated in the attached drawings, and described in the following specification, are simply exemplary embodiments or aspects of the invention. Hence, specific dimensions and other physical characteristics related to the embodiments or aspects disclosed herein are not to be considered as limiting.

As used herein, the terms "communication" and "communicate" refer to the receipt or transfer of one or more signals, messages, commands, or other type of data. For one unit or component to be in communication with another unit or component means that the one unit or component is able to directly or indirectly receive data from and/or transmit data to the other unit or component. This can refer to a direct or indirect connection that may be wired and/or wireless in nature. Additionally, two units or components may be in communication with each other even though the data transmitted may be modified, processed, and/or routed between the first and second unit or component. For example, a first unit may be in communication with a second unit even though the first unit passively receives data and does not actively transmit data to the second unit. As another example, a first unit may be in communication with a second unit if an intermediary unit processes data from one unit and transmits processed data to the second unit. It will be appreciated that numerous other arrangements are possible.

FIG. 1 is a schematic diagram of a system 1000 for determining a communication status of locomotives in a distributed power system according to a preferred and non-limiting embodiment of the present invention. In the illustrated example, a train consist 10 may include a lead locomotive 12, a first remote locomotive 14, and a second remote locomotive 16. It should be understood that this configuration is used by way of example only and that the train consist 10 may include only one remote locomotive or it may include more than two remote locomotives. A plurality of railcars, not shown in FIG. 1, may be arranged between the locomotives, following the locomotives, and/or the like. Each locomotive may include an on-board control system 18, such as at least one on-board computer, train management computer, and/or other like computing device, that includes at least one processor 20 and at least one database 22. The processor 20 may include, for example, one or more microprocessors, controllers, CPUs, and/or the like, and is programmed or configured to control and/or manage various systems or components on board each locomotive and/or throughout the train consist 10. Each on-board control system 18 may also include, control, or be in communication with certain combinations of communication devices 24, such as, but not limited to wireless communication devices, communication units, radio transmitters, receivers, and/or transceivers, that are programmed or configured for enabling wireless communication by and among the locomotives 12, 14, 16. One or more antennae 25 may be provided for each locomotive to operate with the communication devices 24, as is known in the art. It will be appreciated that, while like reference numerals are used to refer to the on-board control system 18, processor 20, database 22, and communication device 24 of each locomotive 12, 14, 16, that different systems and/or components may be used on each locomotive 12, 14, 16.

With continued reference to FIG. 1, the processor 20 of the lead locomotive 12 may be programmed or configured to function as the controlling processor of a distributed power communication scheme, such as one designed and implemented by the assignee of the present invention, Westinghouse Air Brake Company, and/or as described in U.S. Pat. No. 5,720,455, the entire contents of which are hereby incorporated by reference. The lead locomotive processor 20 may be configured for, among other things, transmitting command instructions within a command message to the remote locomotives 14 and 16. A command message may include command instructions to be executed, implemented, and/or acted upon by the remote locomotives 14, 16 in accordance or compliance with the distributed power communication scheme. Command instructions may include, but are not limited to, direct or indirect commands, direction commands, traction commands, dynamic braking commands, air brake commands, and/or any other commands relating to electrical and/or pneumatic functions of the train consist 10. For example, the command instruction may be transmitted from the lead locomotive 12 to at least one of the remote locomotives 14, 16 to slow down or accelerate the train.

In a preferred and non-limiting embodiment, the lead locomotive 12 may transmit a command message by broadcasting the command message via radio frequency such that it can be received by the remote locomotives 14, 16 that are within range. The lead locomotive 12 may transmit the command message periodically, e.g., about once every 10-30 seconds, if there are no command changes. The lead locomotive 12 may also be configured in a receive mode in which the on-board control system 18 listens for messages from the remote locomotives 14, 16. If a command change is determined, the lead locomotive 12 may then transmit the associated command change instructions in response to the change. This transmission may be substantially immediately within the limits of the protocol of the distributed power communication scheme. In a preferred and non-limiting embodiment or aspect, a minimum time between transmissions may be about once every 1-3 seconds, and in another embodiment or aspect, once every 4-6 seconds, and in a still further embodiment or aspect, once every 8-10 seconds. It will be appreciated that various other time intervals may be used and that, in other non-limiting examples, the lead locomotive 12 may only transmit command messages in response to events such as, for example, command changes or user input.

When the lead locomotive 12 transmits a command message, the lead locomotive 12 expects a response message from each remote locomotive 14, 16 of the train consist 10 indicative of the actual functional status or condition of the respective remote locomotive 14, 16. If a response message is not received directly from all remote locomotives 14, 16, or if the lead locomotive 12 cannot otherwise determine the status of a remote locomotive 14, 16, the lead locomotive 12 may re-transmit the command message. If the status or condition of a remote locomotive 14, 16 is not determined in response to or based on the re-transmitted command message, the lead locomotive 12 may continue to transmit the command message periodically, e.g., about every 2-10 seconds, until the functional status of all of the remote locomotives 14, 16 is determined.

Still referring to FIG. 1, the processor 20 of the remote locomotives 14, 16 may be programmed or configured to receive command messages from the lead locomotive 12 and to generate and transmit a respective response message in response thereto. The response messages are generated based on remote locomotive data such as, for example, data indicative of the respective transmitting remote locomotive's actual operational status or condition and/or its correspondence, alignment, or conformance with instructions contained in the command message. For example, the response message of the remote locomotive 14, 16 may include data indicative of a respective remote locomotive's actual status related to configurable settings, throttle settings, speed, direction, braking information, and/or air brake pressure information. In a preferred and non-limiting embodiment, the response message also includes the command message received from the lead locomotive.

The remote locomotives 14, 16 may generate and transmit a response message at predetermined intervals and/or in response to the occurrence of an event, such as the receipt of a command message or the detection of an error on the remote locomotive 14, 16. In some non-limiting embodiments, the remote locomotives 14, 16 may be programmed or configured to generate and transmit a response message at staggered intervals, such that the first remote locomotive 14 may transmit a response message at a predetermined time prior to when the second remote locomotive 16 transmits a response message. It will be appreciated that the remote locomotives 14, 16 may generate and/or transmit response messages based on various factors and at various times.

Upon receipt of the response message by the lead locomotive 12, the data in the message may be used by the lead locomotive 12 to determine whether the respective remote locomotive 14, 16 is following the appropriate command instructions from the command message. A response message generated by a remote locomotive may also include data indicative of, associated with, or related to additional status or condition information of the respective remote locomotive 14, 16. For example, this additional information may relate to the traction motor current and/or main reservoir pressure.

Figure 3:
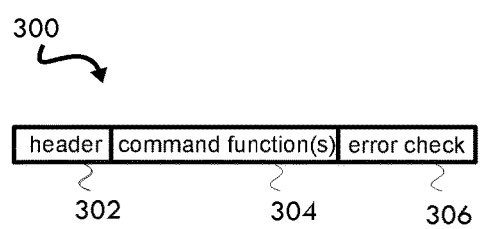
FIG. 3 is a data structure of a command message according to the principles of the present invention.
Figure 4:
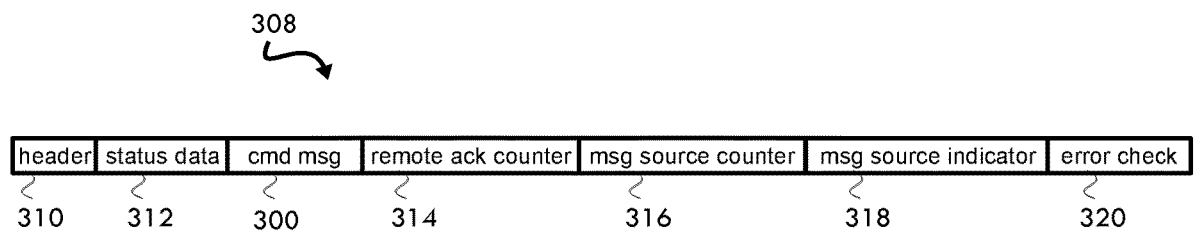
FIG. 4 is a data structure of a response message according to the principles of the present invention.

FIGS. 3 and 4 illustrate, respectively, a command message 300 and a response message 308 according to preferred and non-limiting embodiments. The sections 302, 304, 306, 310, 312, 314, 316, 318, 320 of the messages 300 and 308 may be a predetermined number of bits, fixed or variable-sized fields in a data structure, and/or the like. It will be appreciated that the sections 302, 304, 306, 310, 312, 314, 316, 318, 320 may be alphanumeric strings, characters, integers, binary values, and/or any other type of variable. It will also be appreciated that the command message 300 and response message 308 may also be one or more objects in an object-oriented hierarchy, a plurality of smaller messages, or any other type of data structure capable of specifying parameters and/or conveying information.

The command message 300 shown in the non-limiting embodiment of FIG. 3 includes a header 302, a command function(s) section 304, and an error check section 306. It will be appreciated that various other sections may be included in the command message 300 and that the command message 300 may be structured in any number of other ways. The header 302 may include one or more identifiers that identify the source of the command message 300, such as a lead locomotive, as well as the remote locomotives that are to receive and act upon the command message 300. The header 302 may also include a sequence number or other like variable to uniquely distinguish between different command messages. In some examples, the sequence number may be a separate field of the command message 300. The command function(s) section 304 may include various commands, such as distributed power operation commands, for the remote locomotive to execute. In some examples, the command message 300 may convey information to the remote locomotives and not necessary trigger an operational change. The error check 306 section may be a checksum or any other like form of data to enable verification by a recipient locomotive that the message is intact and valid.

The response message 308 shown in the non-limiting example of FIG. 4 includes a header 310, a status data section 312, a command message 300, a remote acknowledgement count section 314, a message source count section 316, a message source indicator section 318, and an error check section 320. The header 310 may include one or more identifiers that identify the source of the response message, such as the remote locomotive that generates and transmits such a message. The status data section 312 may include data representative of one or more statuses of the remote locomotive and an acknowledgement of receipt, as examples. The command message 300 may be the command message received by the remote locomotive generating the response message 308 (or a portion thereof), either from the lead locomotive or from another response message 308 including the command message 300. The remote acknowledgement count section 314 may be a value of a programmatic counter that indicates a number of response messages received by other remote locomotives. The message source count section 316 may be a value of a programmatic counter that indicates a number of response messages received by other remote locomotives that, in turn, received a command message directly from the lead locomotive. The message source indicator section 318 may be a value of a semaphore, such as but not limited to a flag or other like variable, that indicates either a first state in which the remote locomotive generating the response message 308 received the command message 300 directly from the lead locomotive, or a second state in which the remote locomotive generating the response message 308 did not receive the command message 300 directly from the lead locomotive but, instead, received it from a response message transmitted by another remote locomotive. The value of the message source indicator section may represent the first and second state in any number of ways, such as "LEAD" and "REMOTE," a binary representation of true (1) or false (0), or may be any other data concerning the status and/or state of the remote locomotive.

Figure 2:
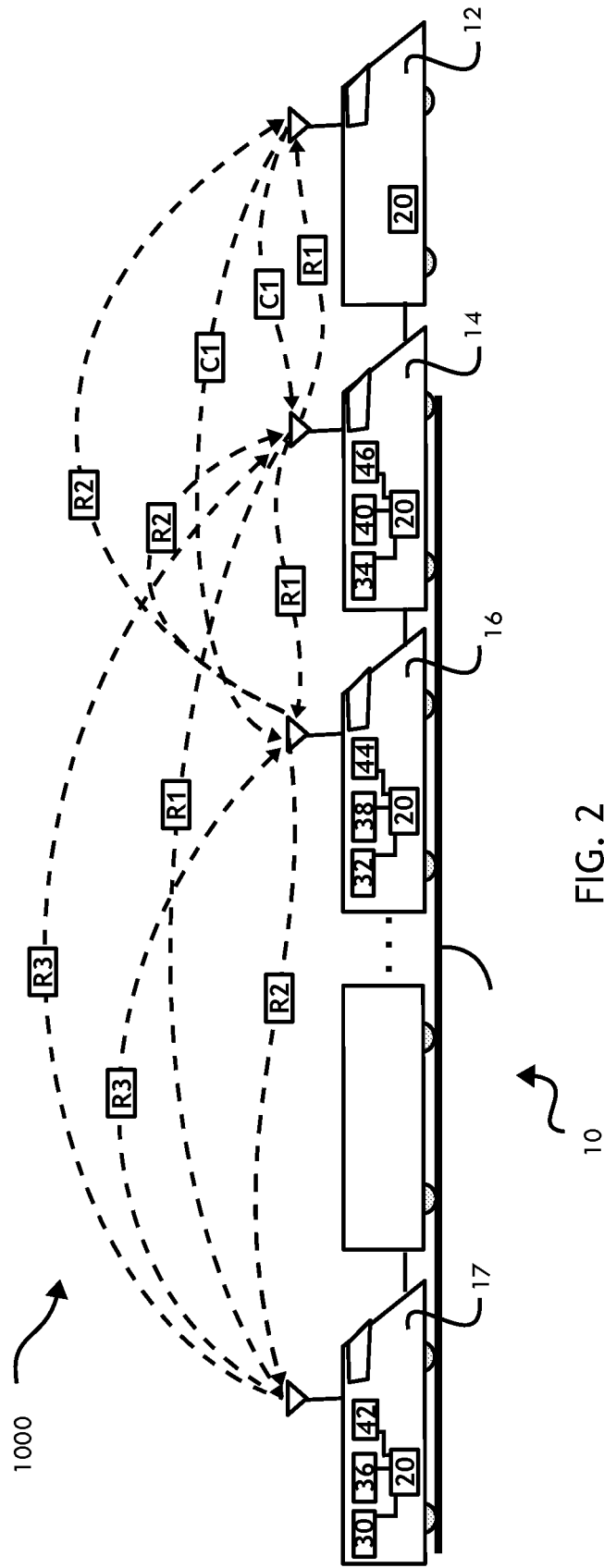
FIG. 2 is another schematic diagram for a system for determining a communication status of locomotives in a distributed power system according to the principles of the present invention.

Referring now to FIG. 2, a system 1000 for determining a communication status of locomotives in a distributed power system is shown according to a preferred and non-limiting embodiment. A consist 10 includes a lead locomotive 12, a first remote locomotive 14, a second remote locomotive 16, and a third remote locomotive 17. FIG. 2 shows three remote locomotives by way of example, but there may be any number of remote locomotives arranged in a distributed power system according to non-limiting embodiments of the present invention. The first remote locomotive 14 includes a processor 20 that is in communication with a first remote message source counter 34, a remote acknowledgement counter 40, and a message source indication 46. Likewise, the second remote locomotive 16 includes a processor 20 in communication with a second remote message source counter 32, a second remote acknowledgement counter 38, and a second message source indication 44, and the third remote locomotive 17 includes a processor 20 in communication with a third remote message source counter 30, a third remote acknowledgement counter 38, and a third message source indication 42.

With continued reference to FIG. 2, the remote message source counters 30, 32, 34 and remote acknowledgement counters 36, 38, 40 of each remote locomotive may be programmatic counters maintained by the respective processor 20 of each remote locomotive 14, 16, 17. The message source indication 42, 44, 46 may be a value representing whether a command message was received directly from the lead locomotive 12 or indirectly from another remote locomotive. The message source indication 42, 44, 46 may be a semaphore that is programmatically set to represent at least a first or second state, representing whether the remote locomotive 14, 16, 17 received a command message C1 directly from the lead locomotive 12 or, instead, only from other remote locomotives 14, 16, 17.

Still referring to FIG. 2, the command message C1 is transmitted from the lead locomotive 12. In the illustrated example, the command message C1 is received by the first remote locomotive 14 and the second remote locomotive 16, but not the third remote locomotive 17. The response messages R1, R2, R3 are subsequently transmitted from the remote locomotives 14, 16, 17, including the command message C1 therein. For example, after receiving the command message C1, the first remote locomotive 14 sets its message source indicator 46 to a first state (e.g., "LEAD"), indicating that the command message C1 was received directly from the lead locomotive 12, and may increment the remote acknowledgement counter 40 to account for the receipt of the command message C1. It will be appreciated that, in some non-limiting embodiments, the remote acknowledgement counter 40 may be incremented every time the corresponding remote locomotive 14 receives a message from a remote locomotive or an original command message from a lead locomotive 12. In other non-limiting embodiments, the remote acknowledgement counter 40 may only be incremented in response to receiving a message from a remote locomotive. Then, at a predetermined interval or in response to receiving the command message C1 or other event, the first remote locomotive 14 transmits a first response message R1 that is received by the other locomotives 12, 16, 17. Response message R1 includes the command message C1, the message source indicator 46, the remote acknowledgement counter 40, and other data. Likewise, the second remote locomotive 16 receives command message C1 and response message R1. After receiving the command message C1, the second remote locomotive 16 sets its message source indicator 44 to a first state (e.g., "LEAD"). After receiving the first response message R1, the second remote locomotive 16 increments its message source lead counter 32 and remote acknowledgement counter 38. As explained above, the remote acknowledgement counter 38 may either have a value of zero (0) upon receiving the first response message R1 or, in other examples, may have a value of one (1) if the counter 38 was incremented upon receiving the command message C1. The message source lead counter 32 is incremented in response to determining that the first response message R1 indicated that the first remote locomotive 14 had its message source indicator set to a first state (e.g., "LEAD"). The remote acknowledgement counter 38 is incremented in response to determining that the response message R1 was received from a remote locomotive, regardless of the value of the message source indicator in the response message R1.

With continued reference to FIG. 2, the second remote locomotive 16 generates and transmits a second response message R2 that includes the message source indicator 44, the message source counter 32, and the remote acknowledgement counter 38. In this example, the message source indicator 44 is set to a first state (e.g., "LEAD"), indicating that the second remote locomotive 16 received the command message C1 directly from the lead locomotive 12, the message source counter 32 is set to a value of "1," and the remote acknowledgement counter 38 is incremented to a value of "2." In non-limiting embodiments in which the original command message does not increment the remote acknowledgement counters, the remote acknowledgement counter 38 may be set to "1." The second response message R2 is received by the lead locomotive 12, the first remote locomotive 16, and the third remote locomotive 17. In this example, the third remote locomotive 17 did not receive the command message C1 directly from the lead locomotive 12, which may be a result of a communication loss, a long consist, environmental conditions, physical obstructions, signal disturbances, and/or the like. However, the third remote locomotive 17 receives the first response message R1 and the second response message R2 from, respectively, the first and second remote locomotives 14, 16. Thus, the third remote locomotive 17 has received the command message from the response messages R1, R2 and sets its message source indicator 42 to a second state (e.g., "REMOTE"), indicating that it only received the command message C1 indirectly, and did not receive command message C1 directly from the lead locomotive 12.

After receiving both the first response message R1 and the second response message R2, the third locomotive 17 increments both its message source counter 30 and remote acknowledgement counter 36. Therefore, in the example depicted in FIG. 2, both the message source counter 30 and the remote acknowledgement counter 36 have a value of "2." The third remote locomotive 17 then generates and transmits a third response message R3, including the value of the message source counter 30, remote acknowledgement counter 36, and message source indicator 42, that is received by the first and second remote locomotives 14, 16. It will be appreciated that the response messages R1, R2, R3 may be sent at predetermined intervals, in response to an event, such as receiving a message or receiving a command change, and/or in other like ways.

It will be appreciated that the remote locomotives 14, 16, 17 may generate and/or transmit response messages R1, R2, R3 in a staggered manner, such that remote locomotive 14 sends response message R1 at a time before remote locomotive 16 sends response message R2. Likewise, the second remote locomotive 16 may send the second response message R2 at a time before the third remote locomotive 17 sends the third response message R3. The staggering of response times may allow for some remote locomotives to potentially receive response messages from other remote locomotives before generating and transmitting its own respective response message, thereby reflecting values of the message source counter 30, 32, 34 and remote acknowledgement counter 36, 38, 40 that can be used to determine a communication status for the train. The message source counter 30, 32, 34 and remote acknowledgement counter 36, 38, 40 may be reset in response to the respective remote locomotive 14, 16, 17 receiving a new command message that it had not previously received. For example, the respective on-board computers 20 of the remote locomotives 14, 16, 17 may determine if a command message is new based on a sequence number in the command message or some other variable. If a command message is received with a sequence number that matches a sequence number that was previously received, the on-board computer 20 can determine that the command message is a duplicate. If the command message was previously received, the on-board computer 20 may stop incrementing the remote acknowledgement counters 36, 38, 40 for every repeat or duplicate message it receives. As an example, the remote acknowledgement counters 36, 38, 40 may only be incremented a number of times equal to the number of remote locomotives (e.g., incremented once for each remote locomotive). The message source indicator 42, 44, 46 for the remote locomotive may also be reset in response to receiving a command message with a new sequence number. In other non-limiting embodiments, the values of the message source counter 30, 32, 34, remote acknowledgement counter 36, 38, 40, and message source indicator 42, 44, 46 may be reset in response to the remote locomotive transmitting a response message.

Figure 5:
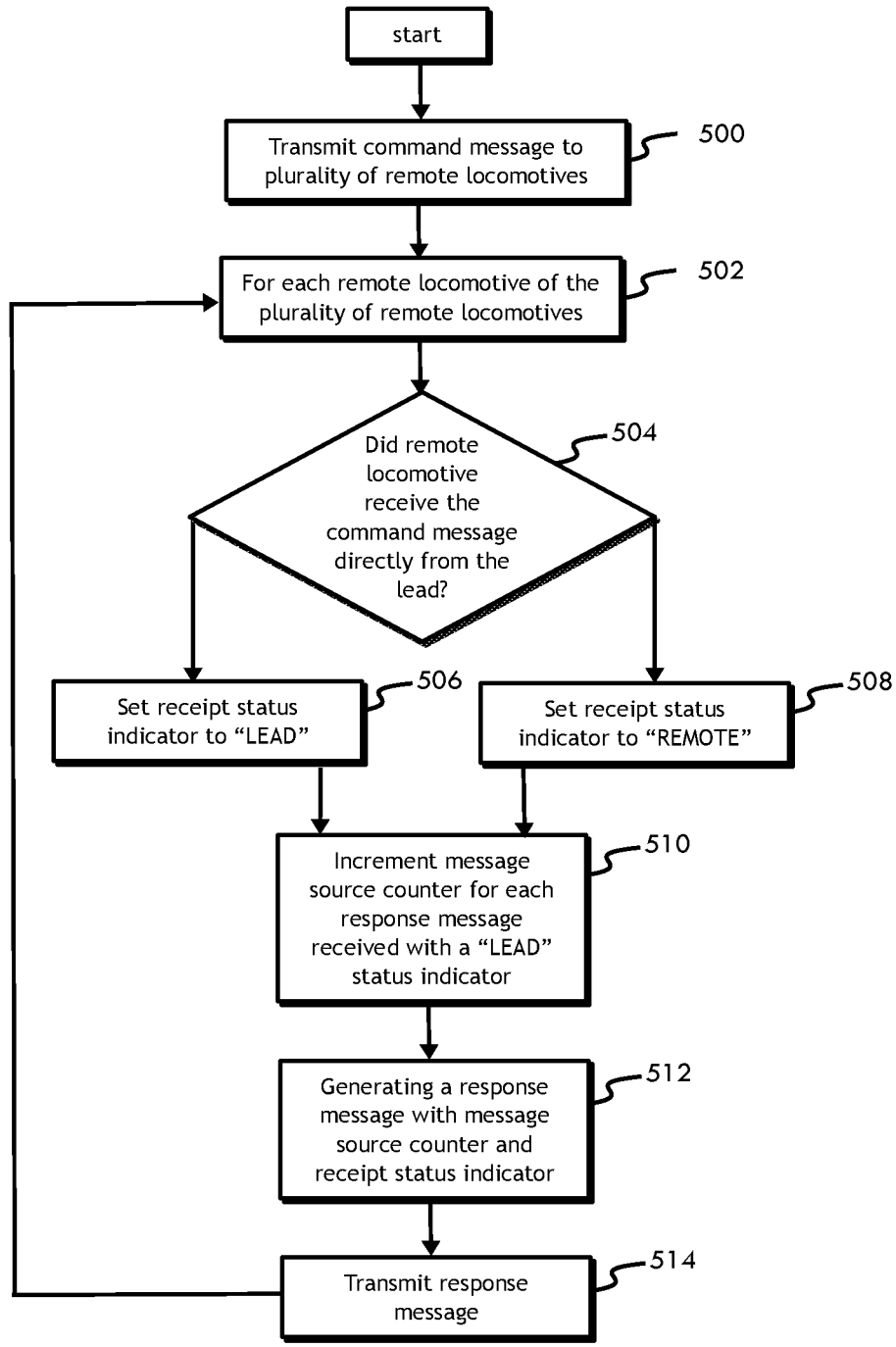
FIG. 5 is a flow diagram for determining a communication status of locomotives in a distributed power system according to the principles of the present invention.

Referring now to FIG. 5, a method for determining a communication status of locomotives in a distributed power system is shown according to a preferred and non-limiting embodiment. At a first step 500, a lead locomotive transmits a command message to a plurality of remote locomotives in a train consist. The method then proceeds to step 502, in which a process is carried out on board each remote locomotive. For each remote locomotive in a consist, an on-board system of the remote locomotive determines whether the command message was received directly from the lead locomotive at step 504. This determination may be made by analyzing the data received, including but not limited to a header of a command message, to identify the source of the data.

With continued reference to FIG. 5, if it is determined that the command message was received directly from the lead locomotive at step 504, the method proceeds to step 506 in which the message source indicator of the remote locomotive is set to a first state (e.g., "LEAD"). If it is determined at step 504 that the command message was not received directly from the lead locomotive, but rather received indirectly from another remote locomotive, the method proceeds to step 508 in which the message source indicator of the remote locomotive is set to a second state (e.g., "REMOTE"). After the message source indicator is set to either a first or second state, the method proceeds to step 510 in which the message source counter of the remote locomotive is incremented for each response message received from other remote locomotives in which the message source indicator is set to the first state (i.e., for each response message received from a remote locomotive that itself received the command message directly from the lead locomotive). The remote acknowledgement counter of the remote locomotive may also be incremented in response to receiving a command message directly or indirectly from the lead locomotive (not shown in FIG. 5).

Still referring to FIG. 5, the method proceeds to step 512 in which a response message is generated by the remote locomotive that includes values of the message source counter and the message source indicator. As explained above, the response message may be generated by the remote locomotive at a predetermined interval and/or in response to receiving a message or the occurrence of some other event. At step 514, the response message is transmitted such that it can be received by any locomotives of the train that are within range and capable of receiving the message. The method then returns to step 502 to repeat steps 504, 506 or 508, 510, 512, and 514 for each remote locomotive. Each remote locomotive in the consist may perform at least steps 512 and 514 at staggered time intervals, such that each remote locomotive generates and transmits a respective response message at respective times.

Figure 6:
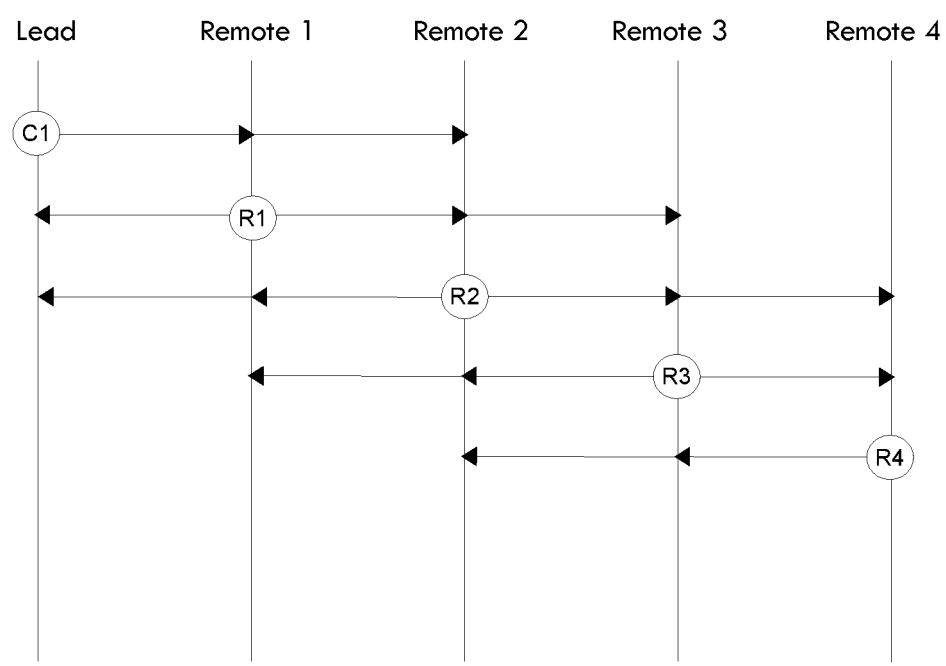
FIG. 6 is a sequence diagram for a system for determining a communication status of locomotives in a distributed power system according to the principles of the present invention.

Referring now to FIG. 6, a sequence diagram for determining a communication status of locomotives in a distributed power system is shown according to a preferred and non-limiting embodiment. In the illustrated example, there are four remote locomotives in a train consist. However, it will be appreciated that any number of remote locomotives may be used with non-limiting embodiments of the present invention. The lead locomotive transmits command message C1, which is received by the first and second remote locomotives. The first remote locomotive increments its remote acknowledgement counter and, at a predetermined interval, generates and transmits a first response message R1, which in the illustrated example is received by the lead, second, and third remote locomotives but not the fourth remote locomotive. The second remote locomotive increments its remote acknowledgement counter and, at a predetermined interval that is staggered so as to be subsequent to the transmission of the first response message R1 from the first remote locomotive, generates and transmits a second response message R2. In this example, the second response message R2 would include a message source counter with a value of "1" and a remote acknowledgement counter with a value of "2," indicating that the second locomotive received a command message from the lead locomotive and a response message from the first locomotive. The second response message R2 would also include a message source indicator with a value representing a first state (e.g., "LEAD"), indicating that the second remote locomotive received the command message C1 directly from the lead locomotive. The second response message R2 is transmitted from the second remote locomotive and, in the illustrated example, received by all of the other locomotives.

With continued reference to FIG. 6, the third locomotive, at a predetermined interval that is staggered so as to be subsequent to the transmission of the second response message R2 from the second remote locomotive, generates and transmits a third response message R3. In this example, the third response message R3 would include a message source counter with a value of "2" and a remote acknowledgement counter with a value of "2," since the third remote locomotive received response messages from both the first and second remote locomotives in which the message source indicator was set to a first state (e.g., "LEAD"). The response message R3 would also include a message source indicator with a value representing a second state (e.g., "REMOTE"), indicating that the command message C1 was not received directly by the third locomotive from the lead locomotive. The third response message R3 shown in FIG. 6 is received by the first, second, and fourth remote locomotives, but not the lead locomotive.

Still referring to FIG. 6, the fourth locomotive, at a predetermined interval that is staggered so as to be subsequent to the transmission of the third response message R3 from the third remote locomotive, generates and transmits a fourth response message R4. In the illustrated example, the fourth response message R4 is received by the second and third remote locomotives but not by the lead locomotive. The fourth response message R4 would include a message source counter with a value of "1" and a remote acknowledgement counter with a value of "2," because the fourth remote locomotive received response messages from both the second and third remote locomotives, but only the second remote locomotive received the command message C1 directly from the lead (and therefore has a message source indicator with a value representing a first state).

With reference to FIG. 6, once each of the remote locomotives receives a new command message, such as a command message having a sequence number that was not previously received, the remote locomotive may reset the values of the message source counter, remote acknowledgement counter, and message source indicator. As explained above, in other non-limiting embodiments the message source counter, remote acknowledgement counter, and message source indicator may also be reset in response to a remote locomotive transmitting a respective response message R1, R2, R3, R4. In non-limiting embodiments in which the values of the message source counter and remote acknowledgement counter are reset in response to sending a response message, the values of the message source counter and remote acknowledgement counter may be incremented after a response message is sent and the values reset. For example, after the first remote locomotive transmits the first response message R1 and resets the value for the message source counter and remote acknowledgement counter, it may increment its message source counter and remote acknowledgement counter after receiving the second response message R2, and may increment the remote acknowledgment counter again after receiving the third response message R3, maintaining those values until the next time it transmits a response message. Further, after the third remote locomotive transmits the third response message R3, the remote acknowledgement counter of both the first and second remote locomotives may be incremented and that value maintained until either being modified based on the receipt of another response message or the next time the remote locomotive transmits a response message (either at a predetermined interval or in response to an event). After the fourth remote locomotive transmits the fourth response message R4, the remote acknowledgement counter of both the second and third remote locomotives may also be incremented. In some embodiments, the remote acknowledgement counters may only be incremented in response to receiving a response message from a locomotive it had not previously received a response from, and may not be incremented in response to receiving a repeated or duplicated response message.

The on-board control system of the lead locomotive, after receiving response messages from the remote locomotives, determines a communication status for the train consist. The communication status may be, for example, representative of a train-wide quality of service. The on-board control system of the lead locomotive may generate a quality of service indication, such as a metric, chart, report, and/or the like, that is reported to the operator of the train, a back office system, and/or other parties. The train-wide quality of service may be with respect to a quality of transmission, a quality of reception, and/or both. For example, the on-board control system of the lead locomotive may monitor the message source counter for each response message received and, based on the message source counters, determine a number of remote locomotives that received the command message directly from the lead locomotive.

The train-wide quality of transmission represents a number of remote locomotives that received the command message directly from the lead locomotive. For example, if all remote locomotives responded with a message source indication set to a first state (e.g., "LEAD"), the train-wide quality of transmission would be 100%. If a response message is not received by the lead locomotive for each remote locomotive in the train consist, the message source counter may be used to determine the train-wide quality of transmission. For example, by analyzing the values of the message source counter for each response message received by the locomotive, it can be determined how many remote locomotives directly received the command message. In the example shown in the sequence diagram of FIG. 6, as an example, the train-wide quality of transmission would be 50% because the highest value of a message source counter is "2," due to the fact that only the first and second remote locomotives received the command message C1 directly from the lead locomotive.

The train-wide quality of reception represents a number of response messages received by the lead locomotive. For example, if the lead locomotive receives a response message from each remote locomotive in the train consist, the train-wide quality of reception would be 100%. If the lead locomotive does not receive a response message from each remote locomotive, the remote acknowledgment counter may be used to determine the train-wide quality of reception. For example, by analyzing the values of the remote acknowledgment counter in each response message received at the lead locomotive, it can be determined how many remote locomotives transmitted a response message that was received by at least one other locomotive. Based on this value, it can then be determined what percentage of response messages was received by the lead locomotive. In the example shown in the sequence diagram of FIG. 6, the train-wide quality of reception would be 50% because the lead locomotive received response messages from the first and second remote locomotives but not from the third and fourth remote locomotives. According to the example shown in FIG. 2, both the train-wide quality of transmission and the train-wide quality of reception would be approximately 66% because the first and second remote locomotives 14, 16, but not the third remote locomotive 17, received the command message C1 directly, and because the lead locomotive 12 received the first and second response messages R1, R2 not the third response message R3.

Figure 7A:
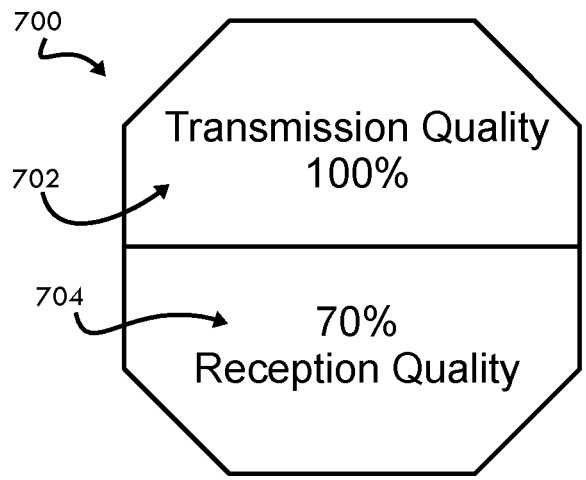
FIGS. 7A and 7B are quality of service indications according to the principles of the present invention.
Figure 7B:
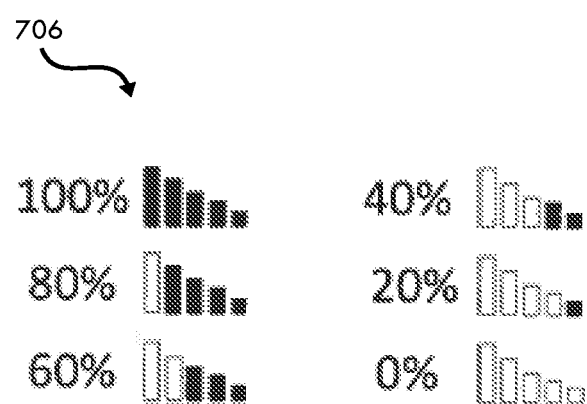

FIGS. 7A and 7B illustrate example quality of service indications 700, 706 according to preferred and non-limiting embodiments. FIG. 7A illustrates a quality of service indication 700 comprising both a quality of transmission indication 702 and quality of reception indication 704. In the illustrated example, the quality of transmission of 100% indicates that all remote locomotives received the command message directly from the lead locomotive. However, the 70% quality of reception indicates that only 70% of response messages were received by the lead locomotive. FIG. 7B illustrates several quality of service indications 706 that may represent a quality of transmission, a quality of reception, or both. The indications 706 shown in FIG. 7B are in the form of signal-strength charts and numerical representations. It will be appreciated that quality of service indications may include a signal-strength bar chart, a numerical representation, an image or icon, a color-coded visual representation, or any other like visual indicators representative of a communication status. Quality of service indications may be for an entire train, for a specified lead or remote locomotive, for a specified group of locomotives, or for any other portion of a train consist. Moreover, the quality of transmission and quality of reception values may be combined by averaging the values or applying an algorithm, resulting in a single train-wide quality of service indication. In the example shown in FIG. 7A, for example, a train-wide quality of service indication may be 85%, representing an average of the 100% and 70% indications.

In a non-limiting embodiment, the response messages received by the lead locomotive may be used to determine or identify a remote locomotive that requires servicing or maintenance. For example, instead of or in addition to generating a quality of service indication, the lead locomotive may analyze the response messages received, including values of the message source indicator, message source counter, and/or remote acknowledgement counter, to identify one or more remote locomotives that are experiencing error(s) or fault(s). An identification of a remote locomotive that requires serving or replacement may be based at least partially on historical data to distinguish between faults and aberrations that occurred due to environmental or geographic conditions. As an example, the lead locomotive may maintain a counter for each remote locomotive that does not receive a command message and/or does not transmit a response message. If the counter exceeds a predetermined threshold, an alert may be generated to indicate the need for service or maintenance.

In further non-limiting embodiments, the quality of service indications may be recorded in relation to a geographic region, track segment, and/or other locational parameters. In this manner, historical quality of service indications may be analyzed to identify particular regions and/or track segments in which a low quality of service is regularly experienced. One or more algorithms may be implemented to analyze the historical quality of service indications or other stored data concerning response messages received by the lead locomotive from remote locomotives. Those skilled in the art will appreciate that other variations are possible.

Although the invention has been described in detail for the purpose of illustration based on what is currently considered to be the most practical and preferred embodiments, it is to be understood that such detail is solely for that purpose and that the invention is not limited to the disclosed embodiments, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

The invention claimed is:

1. A method comprising:
    directly or indirectly receiving a first command message sent from a lead vehicle at each of plural remote vehicles in a vehicle system that includes the lead vehicle and the remote vehicles;
    setting one or more message source indicators of one or more of the remote vehicles that directly received the first command message to a first state;
    setting one or more of the message source indicators of one or more of the remote vehicles that indirectly received the first command message to a second state that differs from the first state, the first state and the second state of the message source indicators of the remote vehicles at least partially indicative of a status of communication between the lead vehicle and the remote vehicles; and
    sending one or more response messages from the one or more remote vehicles to the lead vehicle in response to receiving the first command message, the one or more response messages including the one or more message source indicators of the one or more remote vehicles.

2. The method of claim 1, further comprising:
    changing one or more values of one or more message counters of the one or more remote vehicles that directly received the first command message, the one or more values of the one or more message counters changed based on receipt of the first command message received from one or more others of the remote vehicles that also directly received the first command message, the one or more values of the one or more message counters also at least partially indicative of the status of communication between the lead vehicle and the remote vehicles.

3. The method of claim 2, further comprising:
    resetting the one or more values of the one or more message counters of the one or more remote vehicles that directly received the first command message responsive to receiving a second command message from the lead vehicle.

4. The method of claim 2,
    wherein the response message from the one or more remote vehicles includes the one or more values of the one or more message counters.

5. The method of claim 2, wherein the one or more values of the one or more message counters indicate a number of the remote vehicles that directly received the first command message from the lead vehicle.

6. The method of claim 1, wherein setting the one or more message source indicators of the one or more remote vehicles that directly received the first command message to the first state and setting the one or more message source indicators of the one or more remote vehicles that indirectly received the first command message to the second state includes changing one or more semaphores of the one or more remote vehicles.

7. The method of claim 1, further comprising:
changing remote acknowledgement counters of the remote vehicles responsive to receiving the first command message from the lead vehicle or receiving the first command message from another of the remote vehicles, wherein values of the remote acknowledgement counters indicate a quality of service of communications between or among the lead vehicle and the remote vehicles.

8. The method of claim 1, further comprising:
determining an arrangement of one or more repeaters within the vehicle system based at least partially on the status of communication.

9. A control system comprising:
communication devices configured to be disposed onboard remote vehicles in a vehicle system, the communication devices configured to directly or indirectly receive a first command message sent from a lead vehicle in the vehicle system; and
one or more processors configured to set one or more message source indicators of one or more of the remote vehicles that directly received the first command message to a first state, the one or more processors also configured to set one or more of the message source indicators of one or more of the remote vehicles that indirectly received the first command message to a second state that differs from the first state, the first state and the second state of the message source indicators of the remote vehicles at least partially indicative of a status of communication between the lead vehicle and the remote vehicles,
wherein one or more of the communication devices of one or more of the remote vehicles are configured to send one or more response messages that include the one or more message source indicator in response to receiving the first command message.

10. The control system of claim 9, wherein the one or more processors are configured to change one or more values of one or more message counters of the one or more remote vehicles that directly received the first command message, the one or more processors configured to change the one or more values of the one or more message counters based on receipt of the first command message received from one or more others of the remote vehicles that also directly received the first command message, the one or more processors configured to change the one or more values of the one or more message counters to at least partially indicate of the status of communication between the lead vehicle and the remote vehicles.

11. The control system of claim 10, wherein the one or more processors are configured to reset the one or more values of the one or more message counters of the one or more remote vehicles that directly received the first command message responsive to receiving a second command message from the lead vehicle.

12. The control system of claim 10, wherein the one or more communication devices are configured to send the one or more response messages with the one or more values of the one or more message counters in the one or more response messages.

13. The control system of claim 10, wherein the one or more processors are configured to change the one or more values of the one or more message counters to indicate a number of the remote vehicles that directly received the first command message from the lead vehicle.

14. The control system of claim 9, wherein the one or more processors are configured to set the one or more message source indicators of the one or more remote vehicles that directly received the first command message to the first state by changing a state of one or more semaphores of the one or more remote vehicles.

15. The control system of claim 9, wherein the one or more processors are configured to set the one or more message source indicators of the one or more remote vehicles that indirectly received the first command message to the second state by changing a state of one or more semaphores of the one or more remote vehicles.

16. The control system of claim 9, wherein the one or more processors are configured to change remote acknowledgement counters of the remote vehicles responsive to receiving the first command message from the lead vehicle or receiving the first command message from another of the remote vehicles.

17. The control system of claim 16, wherein the one or more processors are configured to change values of the remote acknowledgement counters to indicate a quality of service of communications between or among the lead vehicle and the remote vehicles.

18. The control system of claim 9, wherein the one or more processors are configured to determine an arrangement of one or more repeaters within the vehicle system based at least partially on the status of communication.

19. A method comprising:
directly or indirectly receiving a first command message sent from a lead vehicle at each of plural remote vehicles in a vehicle system that includes the lead vehicle and the remote vehicles;
setting one or more message source indicators of one or more of the remote vehicles that directly received the first command message to a first state;
setting one or more of the message source indicators of one or more of the remote vehicles that indirectly received the first command message to a second state that differs from the first state; and
changing one or more values of one or more message counters of the one or more remote vehicles that directly received the first command message, the one or more values of the one or more message counters changed based on receipt of the first command message received from one or more others of the remote vehicles that also directly received the first command message, wherein (a) the first state and the second state of the message source indicators of the remote vehicles and (b) the one or more values of the one or more message counters are at least partially indicative of a status of communication between the lead vehicle and the remote vehicles.

20. The method of claim 19, further comprising:
resetting the one or more values of the one or more message counters of the one or more remote vehicles that directly received the first command message responsive to receiving a second command message from the lead vehicle.

21. The method of claim 19, further comprising:
changing remote acknowledgement counters of the remote vehicles responsive to receiving the first command message from the lead vehicle or receiving the first command message from another of the remote vehicles, wherein values of the remote acknowledgement counters indicate a quality of service of communications between or among the lead vehicle and the remote vehicles.

* * * * *